United States Patent [19]

Styring, Jr.

[11] 3,780,751
[45] Dec. 25, 1973

[54] RESTORING OIL FLOW IN A PIPELINE
[75] Inventor: Ralph E. Styring, Jr., Dallas, Tex.
[73] Assignee: Atlantic Richfield Company, New York, N.Y.
[22] Filed: Dec. 4, 1972
[21] Appl. No.: 312,051

[52] U.S. Cl. .................................. 137/13, 137/154
[51] Int. Cl. ............................................. F17d 1/16
[58] Field of Search .................. 137/1, 13, 15, 236, 137/154

[56] References Cited
UNITED STATES PATENTS
2,958,333  11/1960  Poettraenen ...................... 137/13 X Primary Examiner—Alan Cohan
Attorney—M. David Folzenlogen et al.

[57] ABSTRACT

Liquid oil flow capacity through a portion of a pipeline blocked by cooled, gelled, stationary oil is restored at a lower than normal startup pressure. The blocked portion is divided into segments by spaced-apart injection points. A fluid, preferably a gas, is injected under controlled pressure into the injection points to displace the separate gelled segments and to degrade the gel strength of each displaced segment to the point that liquid oil flow through the blocked portion can be restored at a lower startup pressure. The fluid may be injected into the injection points simultaneously or sequentially. The individual segments may be displaced in an upstream direction, or in a downstream direction, or in both directions, toward naturally-occurring or artifically-created unblocked flow points.

20 Claims, 1 Drawing Figure

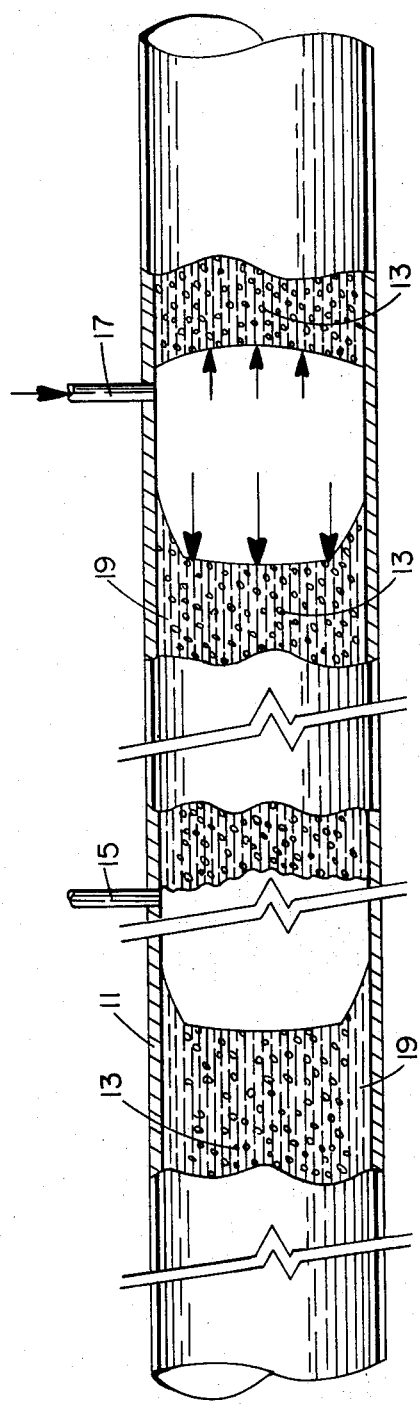

RESTORING OIL FLOW IN A PIPELINE

BACKGROUND OF THE INVENTION

This invention relates to a process for restoring oil flow through a pipeline blocked by gelled stationary oil. More specifically, oil flow capacity in a pipeline is restored by injecting a fluid, preferably a gas, into the blocked portion of a pipeline at spaced-apart points to degrade the yield strength of segments of the stationary oil to the point that liquid oil flow can be renewed at a lower startup pressure.

In cold regions where for long periods the prevailing ambient temperature is cold enough to cool static oil to a temperature approaching or below its pour point, cessation of oil flow through an oil gathering line, or feeder line, or trunk line is likely to lead to blockage of the pipeline when the stationary oil cools and gels. This gives rise to the problem of restarting oil flow when the pipeline is shutdown for a period long enough for the oil to gel. This problem is encountered in the pipelining of crude oils in cold climates like the Arctic regions and in the pipelining of fuel or synthetic high pour point oils. When oil flow through the blocked segment of the pipeline is to be renewed, the static head pressure and/or the length of the blocked portion of the pipeline and the yield strength of the gelled oil may be such that it would require a pressure undesirably high in view of the way that the equipment operates or a pressure exceeding the design pressure of the pipeline or pump to restore the flow of liquid oil through the blocked portion of the pipeline. The design or safe operating pressure of a system varies with the size of the line and the design conditions as well as various safety valves and equipment installed with the line.

A primary object of this invention is to provide a method of restoring oil flow through a segment of a pipeline blocked by stationary oil which substantially fills this segment and which has increased in yield strength to the point that it is undesirable to attempt to renew flow all at one time. A more specific object of this invention is to restore oil flow at a startup pressure lower than would otherwise be required. A still further object is to provide better control over the startup pressure and to provide ways of creating flowable points.

SUMMARY OF THE INVENTION

Liquid oil flow capacity from an upstream flowable point to a downstream flowable point through a portion of a pipeline blocked by stationary gelled oil substantially filling the blocked portion is restored at a pressure lower than the pressure which would normally be required to renew displacement liquid oil through the blocked portion. The normal startup pressure through the entire blocked portion depends on the yield strength of the gelled oil, the internal pipe diameter, the length of the blocked portion, and static head pressure.

The blocked portion terminates in an upstream flowable point and a downstream flowable point and is divided into at least three segments by at least two injection points spaced longitudinally in the blocked portion. A fluid, preferably a gas, under a controlled pressure is injected into each injection point. The controlled pressure, preferably below 750 psig, is below a pressure which would damage the pipeline including related equipment and above the pressure required to displace a segment of the gelled oil toward either a terminal flowable point, or a flowable pumping station, or toward an artificially-created flowable point in the blocked portion. If necessary, the artificially-created flowable point may be initially created by removing at least ten internal pipe diameters of the gelled oil. The spacing of the injection points corresponds to the controlled fluid pressure and to the yield strength of the gelled oil, the internal pipe diameter, the length of the segment to be displaced, and static head pressure. Injection of the fluid thereby displaces a segment of the gelled oil.

The gelled oil is thixotropic. In other words, gel strength degradation takes place in the area of a gel which upon yielding is subjected to a velocity gradient, that is, shear or movement of one layer of gel relative to another layer. Once degraded the degraded gel takes a substantial time to rebuild its strength. Displacement of each gelled segment, preferably for at least eight internal pipe diameters, substantially decreases the pressure required to displace each shear degraded segment. This decreases the pressure required to displace the entire blocked portion and allows renewal of liquid oil flow through the blocked portion at a lower than normal startup pressure. When sufficient segments of the blocked portion have been degraded, liquid oil flow from an upstream flowable point through the blocked portion is renewed at a lower than normal startup pressure. Once liquid oil flow is renewed, continued flow through the blocked portion quickly restores the original liquid oil flow capacity.

The fluid may be injected into the injection points simultaneously in a manner such that the gelled segment nearest a flowable point yields toward the flowable point. The displacing pressure for the yielded segment drops thereby allowing the fluid injected at the next closest injection point to cause the next gelled segment to yield, and so on along the blocked portion. Displacement may be in either or both directions. Downstream displacement is preferred.

As an alternative, the fluid may be injected at each injection point sequentially. Preferably, the fluid will be a gaseous fluid. A gaseous fluid permits better control over the injection pressure, overcomes the problem of the injection fluid gelling or being difficult to inject, eliminates the need for injection pumping equipment, and provides greater adaptability to a particular situation. A gaseous compressible injection fluid has the further advantage of creating a new unblocked point or flowable point. Once a gelled segment has been displaced by a gas, the gas bubble behind the segment may be bled to equilibrium or zero gauge pressure thereby increasing the pressure differential between the next injection point and the newly-created flowable point.

The controlled injection pressure required to displace a gelled segment may be predetermined by rheological studies on the gelled oil or by presetting an upper limit on the injection pressure and attempting displacement of a gelled segment of decreasing length until yield and displacement occurs.

BRIEF DESCRIPTION OF THE DRAWING

The drawing is a partially sectionalized, fragmented view of a section of a pipeline illustrating a preferred embodiment of this invention being practiced on a portion of the pipeline blocked by gelled oil.

DETAILED DESCRIPTION OF THE INVENTION

The drawing represents a long section of pipeline 11 which section, as shown, is partially blocked by stationary gelled oil 13 which substantially fills the blocked portion of the pipeline. Flow capacity from an upstream flowable point to a downstream flowable point in the pipeline is hampered by an increase in yield pressure of the gelled oil. When the flow of oil was ceased and the oil was not drained from the pipeline, an increase in yield pressure occurred because the pipeline is in a region where the ambient temperature was cold enough to cool the oil to a temperature approaching or below its pour point. In other words, while flowing at normal temperatures, the oil behaved as a Newtonian fluid, but when flow ceased the static oil cooled or gelled into a thixotropic material with a relatively high yield stress thereby tending to block the pipeline.

Upon cooling, the oil shrinks and this shrinkage could lead to an open space or the creation of a flowable point in some segment of the pipeline. Other portions of the pipeline will remain substantially filled with oil despite the fact that oil shrinks as it cools. Pipelines tend to follow the contour of the terrain and are laid up and down slopes and valleys. This results in elevation differences between sections of the pipeline. For example, in one proposed oil pipeline for Alaska, static head pressures as high as 500 psi at some points may be encountered. This causes the oil at the higher points to flow toward the lower points as the oil cools and shrinks. This creates gaps along the length of the oil which act as flowable points in the line, that is, unblocked points or easy-flow points. Moreover, pipelines may be buried, or only partially or intermittently buried with other segments laid on the surface or elevated on gravel berms or suspended above ground on pile bents. Different segments of the line also exhibit different cooling rates. All of these conditions tend to cause blocked portions and open or only slightly-blocked portions. These open or only slightly-blocked points in the pipeline are referred to as flowable points. The distance between two flowable points is the length of a blocked portion between the points. The length of the blocked portion will tend to vary and will partially depend on the length of contiguous elevated segments of the line. A flowable pumping station may also act as a flowable point. In addition, the pipeline will have an outlet and inlet including outlets and inlets to terminal or producing facilities. These act as flowable points. In this process, at least one naturally-occurring or artificially-created flowable point is used to aid in restoring liquid oil flow.

When liquid oil flow is to be renewed, the startup pressure required to commence movement of the cooled or gelled stationary oil through an entire blocked portion is dependent upon the yield properties of the oil in the blocked portion, the length of the gelled oil, the pressure differential across the blocking gelled oil, and, to a point, on the rate of application of the pressure. The startup pressure could exceed the design pressure of the pumping stations or the safe operating pressure of the pipeline and related equipment. In addition, as previously mentioned, differences in elevation cause a static pressure on the blocked portion of the line. This static pressure adds to the startup pressure differential thereby limiting the startup pressure differential that may be applied to the blocked portion of the pipeline.

In this invention, liquid oil flow capacity from an upstream flowable point through a blocked portion of the pipeline to a downstream flowable point is restored by injecting a fluid into the blocked portion at spaced-apart injection points 15 and 17. As illustrated, the injection points divide the blocked portion into at least three segments and are spaced one from the other along the longitudinal axis of the pipeline. The spacing of the injection points is important. Each of the injection points is spaced sufficiently close to a flowable point or to another injection point to allow a fluid injected at a controlled pressure to displace a segment of the gelled oil toward another injection point or toward a flowable point. The controlled pressure must be below a pressure which will damage the pipeline and must be above the pressure required to displace a segment of the gelled oil toward a previously displaced segment or toward a flowable point. The factors controlling these pressures are the designed pressure of the pipeline including related equipment and the yield pressure of the gelled segment to be displaced. Preferably, in all cases the controlled pressure will be below 750 psig. The yield pressure is herein defined as the pressure at a given temperature at which a gelled oil segment visibly starts to flow after a static period at that temperature. The gelled oil is thixotropic and shear rate degradable. Once the yield pressure is exceeded and the gelled oil begins to move, shear degradation takes place. If flow of the gel is ceased, the yield pressure of that segment of the gelled oil is greatly decreased. If allowed to remain quiescent for a long time, the degraded segment would rebuild its gel strength; but in this process, the gel is not given time to rebuild its gel strength. In the drawing, oil which has been shear degraded is designated by the reference numeral 19 and gelled oil which has not been degraded is represented by the reference numeral 13. As illustrated, degraded gel 19 has a different appearance from gelled oil 13. It is significant to note that once shear degradation has occurred, the degraded gelled oil will not rebuild its gel strength for a period long enough for the process of this invention to be carried out.

The gel tends to form in two ways largely depending on the rate of cooling and the composition of the oil. The rate of cooling depends on a number of conditions especially the diameter of the pipeline and whether or not the line is buried or insulated. Rapid cooling tends to cause inward gelling of the oil. In other words, as the outer edge of the oil cools, components in the oil layer out on the extremities of the pipe. This outer layer is hard and adheres to the walls of the pipeline. The gell continues to form inward toward the center of the pipeline. In larger lines, this could result in the center of the gelled oil exhibiting less yield strength. In large lines, the rate of cooling is slow and this hard inward gelling phenomenon is not as pronounced. The way that the gel forms and certain other conditions affect the manner in which the gel flows upon startup. The manner of flow will lie between two extremes. At one extreme, the gel flows in a piston-like manner. At the other extreme is Newtonian flow. Experimentation with a certain gelled oil will indicate an anticipated manner of flow. In general, flow of the gel will lie somewhere between piston-like flow and half Newtonian flow. In other words, as illustrated in the drawing, the velocity gradient is greatest near the outer edge of the pipeline and there is almost no velocity gradient near the center of the pipeline. Regardless of the manner of flow, near the outer edge the shear rate is large and at least the portion of the gelled oil near the outer edge undergoes shear degradation. This shear degradation significantly reduces the yield pressure of the degraded gelled segment which in turn reduces the yield pressure of the entire blocked portion. The rate of shear degradation or the rate of reduction in yield pressure depends on the rheological properties of the oil and its gel characteristics, and on the rate of displacement of the segment. In this process, the rate of displacement can be primarily related to the internal diameter of the pipeline. It has been found that rate of shear degradation or the rate of reduction in yield pressure initially undergoes rapid degradation or reduction within about the first eight internal pipe diameters of displacement. Thereafter, the rate levels off and is relatively gradual. Obviously, some gels degrade somewhat faster or slower, but for practical purposes it has been found that it is preferred to displace each gelled segment for at least eight internal pipe diameters. Under normal conditions, measurements clearly indicate that a decrease in yield pressure of 40 percent and up to 60 percent can be expected.

The injection of the fluid at each injection point under the controlled pressure thereby displaces and shear degrades a segment of the gelled oil. This then enables displacement of that segment of the gelled oil toward a flowable point at a substantially lower pressure. Since at least two injection points are used, a series of segments of the blocking gelled oil are thereby shear degraded to decrease their yield pressure or flow pressure. It is not necessary to subject all of the blocked portion to shear degradation. It is necessary to displace and shear degrade sufficient segments of the blocked portion to the point that the entire blocked portion may be displaced by liquid oil from an upstream flowable point at a pressure below a pressure which will damage the pipeline and below the pressure which normally would have been required to displace liquid oil through the entire blocked portion. At this point, liquid oil flow at a pressure below the normal startup pressure is renewed and flowed through the blocked portion. Once liquid oil flow through the blocked portion is renewed, continued flow of the liquid oil will restore the flow capacity of the pipeline.

The fluid may be injected into pipeline 11 through injection points 15 and 17 by way of any means suitable for introducing a fluid into a pipeline. The fluid could come from a common source line or from separate sources. By way of example, a convenient way of introducing the fluid is to use a suitable gas, like nitrogen, and to introduce the gas by expansion from an appropriately sized and pressured cylinder or cylinders with or without regulators. The cylinder pressure and size could be selected to provide sufficient gas at the controlled pressure to displace a segment of the gelled oil for the desired distance, for example, the internal pipeline volume of a segment of the pipeline at least eight internal diameters long. The cylinder size and pressure would take into consideration the maximum injection pressure, the yield pressure of the gelled segment to be moved, the amount of displacement desired, and the fact that the pressure required to displace the segment will decline once the yield pressure is reached. The maximum injection pressure will, of course, be restricted and controlled. In addition, the injection rate will be restricted as the pressure approaches the maximum injection pressure. A predetermined maximum injection rate can also be selected from analyses of rheological data obtained on gel studies of the oil. After the gelled segment yields, the rate of displacement of the gelled segment will be limited by the maximum injection rate and the size of the equipment in lines used to introduce the displacing fluid relative to the size of the pipeline. As mentioned previously, the rate of displacement may, therefore, be primarily related to the internal diameter of the pipeline.

If a common injection fluid source is used or if it is more convenient to do so, the fluid may be injected into injection points 15 and 17 simultaneously. Under these circumstances, initially fluid will enter the pipeline through all of the injection points. The pipeline system is compressible and the injection fluid itself may be compressible. The inlet pressure, however, rises rapidly to the yield pressure for each gelled segment. If the inlet rises to the specified maximum value, the rate of injection will begin to decrease. As previously shown, the yield pressure of a gelled segment depends on a pressure differential across the segment. If the fluid is injected simultaneously into the injection points, the pressure differential across all segments except the end segments will for all practical purposes be zero until one or both of the end segments yields in either the upstream or the downstream direction, or in both directions. When an end segment yields, the pressure displacing the end segment declines by increasing the pressure differential across the next or second segment. If the pressure differential rises sufficiently high to cause the second segment to yield, the phenomenon will be repeated for the third segment and others until the purpose of the startup process has been accomplished or until the maximum pressure is reached without causing a segment to yield. In this case, the pressure differential across a segment is not sufficient to cause the segment to yield. In this event, the pressure differential can be increased by decreasing the pressure at the other end of the segment. This can be accomplished by ceasing injection of fluid at this point and, if necessary, bleeding residual pressure.

As an alternative, the injection fluid can be injected sequentially and separately into each injection point to displace each gelled segment separately. If sequential injection is used, it is preferred that the gelled segment be displaced toward a downstream flowable point. The drawing illustrates sequential injection with a gaseous fluid. As illustrated, the fluid under the control pressure was first injected at first injection point 15. First injection point 15 was located sufficiently close to a downstream flowable point (not shown) that the gas injected at first injection point 15 displaced a first segment of gelled oil toward the downstream flowable point. The first segment is the segment between first injection point 15 and the downstream flowable point. Displacement of the first segment created a velocity gradient which was greatest near the outer edges of the pipeline. The velocity gradient or shear rate near these outer edges thereby degraded the gel strength of the first segment of gelled oil. As explained previously, this greatly decreases the yield pressure of that segment especially if the amount of gaseous injection fluid injected at first injection point 15 under the control pressure is at least as great as the internal volume of a segment of the pipeline eight internal diameters long. The injection fluid also creates a flowable point at the first injection point. This enables displacement of the next segment of gelled oil toward the newly-created flowable point. The injection step is sequentially repeated at second injection point 17 and if necessary at other injection points spaced longitudinally along the blocked portion toward the upstream flowable point. Second injection point 17 is located sufficiently close to the flowable point created at the first injection point that the gas injected at injection point 17 will displace the second segment of gelled oil toward the first injection point. Displacement of the second segment thereby degrades the gel strength of the displaced gelled oil and creates a new flowable point at the second injection point. This sequential injection process is continued until there is created a continuous degraded section traversing enough of the blocked portion to allow displacement of liquid oil through the blocked portion at a pressure below the pressure which will damage the pipeline and below the startup pressure which will normally be required to displace liquid oil through the blocked portion. Thereafter, liquid oil from the upstream flowable point is flowed through the blocked portion at a pressure below the startup pressure which would normally be required to displace liquid oil through the entire blocked portion. Renewal of flow of the liquid oil through the blocked portion quickly restores liquid oil flow capacity.

One method of applying the process of this invention is to try fluid injection at pressures within the controlled pressure limits at injection points spaced closer and closer to a flowable point until the intervening gelled oil segment yields. Another method of applying the process is to conduct rheological studies on the oil to be transported and under simulated conditions. Rheological studies involve the following general concepts.

A segment of gelled oil between two points will exhibit a certain yield strength. The pressure differential across the length of a segment of gelled oil can be increased until the gelled oil segment begins to visibly move. The pressure differential at which this movement is initiated is herein called the yield pressure. The force pushing the gel is the product of the internal area of the pipeline multiplied by the pressure differential ($\Delta P$), and at the point of yield, this force is equal to the shear resistance of the gelled oil segment. The shear resistance of the gelled oil segment is approximately equal to the product of the apparent shear stress ($\tau$) multiplied by the internal surface area of the pipeline for the length ($L$) of the segment chosen, that is, $\pi DL$ where $D$ is the internal diameter of the pipeline. As used herein, the apparent shear stress incorporates allowance for visible movement of the gel and a reasonable rate of application of the startup pressure. The following Equation 1 is an expression of the equality of force and shear resistance at the yield pressure:

$$\tau \pi DL = \Delta P \, \pi D^2/4 \quad (1)$$

Equation 1 can be simplified into the following Equation 2:

$$\Delta P = (\tau) \, 4L/D \quad (2)$$

Equation 2 is useful for plotting, scaling or comparing experimental data and for calculating the location and spacing of injection points 15 and 17. For most pipelines, the ratio of $4L$ to $D$ is large for the section of the pipeline between pumping stations. The distance between pumping stations depends on a number of factors including size of the pipeline, the flow rate, the design operating pressure, topographical and rheological factors, and economics.

The yield strength and yield pressure of a segment gelled oil is characteristic of the following factors. Crude oils are usually a complex mixture of oils, waxes, asphalts, bitumens, and resins with a wide range of melting points, cloud points, or pour points. Some of the effects observed when investigating the factors influencing the gel strength and yield pressure of an oil are complex and not fully understood. Concepts or explanations have been proposed which explain at least in part what has been observed and it has been fully demonstrated that the yield pressure of an oil developed during period of quiescence vary widely with the composition of the oil, the temperature, the thermal history of the oil, the rate of cooling, the previous shear history of the oil, aging of the oil, and the compressibility of the system.

The effects of asphalt, waxes, and the like components on the pour point of oil is well known. In addition, the gel strength of an oil is sensitive to the presence or absence of light ends. Weathering, flashing, or removal of light ends leads to a significant increase in gel strength. Moreover, flashing of live crude oil from a producing well to atmospheric pressure in one step leads to a higher yeild strength than multi-step flashing. Of course, the presence of large percentages of water would affect yield, but water is usually separated from the oil before the oil is passed through the pipeline. The mixing of even a small quantity of high yield strength oil tends to lead to a mixture having the yield strength like the high yield strength oil.

In general, decreasing the gel temperature and increasing the rate of cooling increase the yield strength and in turn cause a higher yield pressure.

As to shear history, it has been found that subjecting the oil to high shear conditions tends to increase the yield strength of the gelled oil after it is subsequently cooled to a low temperature. The observed affect of shear depends in part on the temperature of the oil during the time of shear application. The temperature in turn is affected by the composition of the oil.

Aging and thermal history are in some respects alike. As used herein, however, aging relates to time at a given temperature. In general, for a period of time the gel strength of a gel increases. Results indicate that the gel strength begins to stabilize in about 8 to 10 hours of residence time.

The thermal history of an oil primarily relates to cycles in temperature with the peaks in high and low temperatures encountered being important. Generally, if an oil is returned to a high temperature and held at that temperature for a period of time, the effects of prior thermal history are for practical purposes erased. The temperature to which the oil must be raised depends on the composition of the oil. If the temperature of the oil is cycled in a manner such that the oil never reaches the restoration temperature, cycling tends to cause an increase in yield pressure when the oil is subsequently cooled and gelled. The effects of cycling on yield pressure depend in part on the temperature to which the oil is raised during a cycle. The effects of a peak temperature during a cycle depend on the composition of the oil. In general, for normal crude oil, it has been found that cycling of the crude oil at a temperature below 40° F. increases the ultimate yield pressure of the oil when the oil is cooled and gelled. The mechanism by which the yield increase occurs can be explained in the following manner. The asphalt micelles and paraffin crystals form simultaneously when the oil is cooled. If the oil is cooled to a temperature above its gel point or pour point, the cooled oil has no structure and consequently very little gel strength. Upon reheating of the cooled oil, the paraffin tends to go back into solution while the asphalt micelles are not significantly affected unless the temperature is raised significantly. When the temperature is again lowered, the paraffin crystals reform but this time they form within and around the asphalt micelles. This results in a paraffin-asphalt gel structure of considerable strength at low temperatures; consequently, the ultimate yield pressure of a gelled oil which has been subjected to this type of cycling is quite high.

Equations have been developed and published which for purposes of this invention adequately predict yield behavior of gelled, thixotropic oils in pipelines. In general, the shear strength of a certain oil at a certain temperature is approximately a point function of shear rate and shear strain. The relationships involved have been verified experimentally by first returning the oil to its original condition. This is best accomplished by reconstitution of the oil, if desired, and by reheating the oil to some temperature level, for example, the reservoir temperature or some other preceding high process temperature. This temperature level is held for a period of time to overcome the effects of prior yield affecting factors. Thereafter, subsequent factors like rate of cooling, shearing, mixing, temperature cycling, and the like, which measurably influence yield strength, can be controlled and varied or simulated to develop the desired correlations.

EXAMPLE

Samples of oil from Alaska were tested after beneficiation to provide a measure of the lowest yield strength to be expected for that oil and after temperature cycling to provide a picture of a range of yield strengths that could be developed by temperature cycling. The yield strength range in dynes per square centimeter at −40° F. was 60 to 1,750, at −20° F. was 15 to 900, and at 0° F. was 2 to 280. A log-log plot of viscometer data showing dimensionless shear stress versus dimensionless shear rate with curves representing shear strains equal to 0, 10, and 100 showed that with dimensionless shear rates between one ten thousandth and one, displacement of a gelled oil segment for at least eight internal pipe diameters would decrease the dimensionless shear stress to less than 0.6 its value at shear strain zero. Sections of 12-inch ID and 48-inch ID pipelines containing oils like those in samples have been shut in long enough for the oils to gel at the specified temperatures for at least 8 hours. The pipeline is laid with a pump station located 30 miles from a downstream flowable point. The pump station is an upstream flowable point. The downstream point is uphill and starting with the pumping station the pipelines rise at a constant rate of 10 feet per mile to a point 31 miles from the pumping station. Thereafter the pipelines begin to slope downhill. The density of the oil depends on temperature, but for purposes of this example the static pressure rises at the rate of 0.44 psi per foot. Injection points are located in a manner such that the 30-mile blocked portion of the pipelines is divided into equal length segments. It is time to renew liquid oil flow. The startup pressure at the pumping station and the injection points is not to exceed 750 psig. The approximate startup pressure at the pumping station before and after the process of this invention is illustrated in the following TABLE I. The startup pressures are illustrative values only calculated from Equation (2).

TABLE I

| Yield strength | | Injection points | | Approximate pump startup pressures | | | |
|---|---|---|---|---|---|---|---|
| | | | | Normal | | Process | |
| ° F. | Dynes/ sq. cm. | 12″ | 48″ | 12″ | 48″ | 12″ | 48″ |
| −40 | 60 | 2 | 2 | 680 | 270 | <530 | <235 |
| −40 | 1,750 | 21 | 5 | 16,135 | 4,195 | [1] 735 | [1] 705 |
| −20 | 900 | 11 | 3 | 8,320 | 2,210 | [1] 705 | [1] 555 |
| 0 | 280 | 6 | 2 | 2,675 | 780 | [2] <715 | <610 |

[1] Gaseous injection fluid and all but last segment displaced past next pump station.
[2] Liquid oil injection fluid and all but last two segments displaced past next pump station.

The foregoing description illustrates a preferred embodiment of a pipeline startup process. Reasonable variations and modifications are practical within the scope of this disclosure without departing from the spirit and scope of the claims of this invention.

The embodiments of the invention in which an exclusive property or privilege is claimed are defined as follows:

1. A method of restoring liquid oil flow capacity from an upstream flowable point to a downstream flowable point through a portion of a pipeline blocked by stationary gelled oil substantially filling the blocked portion comprising injecting a fluid under controlled pressure into said blocked portion of said pipeline at at least two injection points spaced one from the other along the longitudinal axis of said blocked portion of said pipeline, each of said injection points being spaced such that said fluid injected at each injection point under said controlled pressure will displace a segment of said gelled oil in said blocked portion toward a flowable point, said controlled pressure being below a pressure which would damage said pipeline and at least as great as the pressure required to displace said segment of said gelled oil toward a flowable point, said injection of said fluid at said injection points thereby enabling displacement of liquid oil through said blocked portion at a pressure below a pressure which will damage said pipeline and below the startup pressure which would normally be required to displace liquid oil through said blocked portion, and flowing liquid oil under a pressure below said startup pressure through said blocked portion thereby restoring said liquid oil flow capacity.

2. The method according to claim 1 wherein said controlled pressure of said fluid injected at said injection points is less than 750 psig.

3. The method according to claim 1 wherein the amount of said fluid injected at each injection point under said controlled pressure is at least as great as the internal volume of a segment of said pipeline eight internal diameters long.

4. The method according to claim 3 wherein said controlled pressure of said fluid injected at said injection points is less than 750 psig.

5. The method according to claim 1 wherein prior to injection of said fluid, a flowable point is created inside said pipeline by removing a portion of said gelled oil, the amount of said gelled oil removed being at least as great as the internal volume of a segment of said pipeline 10 internal diameters long.

6. The method according to claim 5 wherein said controlled pressure of said fluid injected at said injection points is less than 750 psig.

7. The method according to claim 5 wherein the amount of said fluid injected at each injection point under said controlled pressure is at least as great as the internal volume of a segment of said pipeline eight internal diameters long.

8. The method according to claim 7 wherein said controlled pressure of said fluid injected at said injection points is less than 750 psig.

9. The method according to claim 1 wherein said fluid injected at said injection points is a gas at the injection conditions.

10. The method according to claim 9 wherein said controlled pressure of said gas injected at said injection points is less than 750 psig.

11. The method according to claim 9 wherein the amount of said gas injected at each injection point under said controlled pressure is at least as great as the internal volume of a segment of said pipeline eight internal diameters long.

12. The method according to claim 11 wherein said controlled pressure of said gas injected at said injection points is less than 750 psig.

13. The method according to claim 9 wherein said gas under said controlled pressure is first injected at a first injection point in said blocked portion of said pipeline, said first injection point being spaced sufficiently close to said downstream flowable point that said gas injected at said first injection point will displace said gelled oil in a first segment between said first injection point and said downstream flowable point toward said downstream flowable point thereby degrading the gel strength of said first segment and creating a flowable point at said first injection point, thereafter sequentially injecting gas under said controlled pressure at at least one other injection point spaced longitudinally along said blocked portion toward said upstream flowable point from the previous injection point, each sequential injection point being sufficiently close to a flowable point created at a preceding injection point that said injected gas will displace a segment of said gelled oil toward the preceding injection point, thereby degrading the gel strength of the displaced gelled oil and creating a new flowable point, until there is created a continuous degraded section traversing enough of said blocked portion to allow displacement of liquid oil through said blocked portion at a pressure below the pressure which will damage said pipeline and below the startup pressure which would normally be required to displace liquid oil through said blocked portion, and flowing liquid oil under a pressure below said startup pressure through said blocked portion thereby restoring said liquid oil flow capacity.

14. The method according to claim 13 wherein said controlled pressure of said gas injected at said injection points is less than 750 psig.

15. The method according to claim 13 wherein the amount of said gas injected at each injection point under said controlled pressure is at least as great as the internal volume of a segment of said pipeline eight internal diameters long.

16. The method according to claim 15 wherein said controlled to injection of said gas at said first injection point, said flowable downstream point gas injected at said injection points is less than 750 psig.

17. The method according to claim 13 wherein prior flowable downstream point is created inside said pipeline by removing a portion of said gelled oil, the amount of said gelled oil removed being at least as great as the internal volume of a segment of said pipeline ten internal diameters long.

18. The method according to claim 17 wherein said controlled pressure of said gas injected at said injection points is less than 750 psig.

19. The method according to claim 17 wherein the amount of said gas injected at each injection point under said controlled pressure is at least as great as the internal volume of a segment of said pipeline eight internal diameters long.

20. The method according to claim 19 wherein said controlled pressure of said gas injected at said injection points is less than 750 psig.

* * * * *

PO-1050
(5/69)

UNITED STATES PATENT OFFICE
CERTIFICATE OF CORRECTION

Patent No. 3,780,751          Dated    December 25, 1973

Inventor(s) Ralph E. Styring, Jr.

It is certified that error appears in the above-identified patent and that said Letters Patent are hereby corrected as shown below:

Column 12, lines 27,28, after the word "controlled", delete "to injection of said gas at said first injection point, said flowable downstream point", and substitute therefor, --pressure of said--.

Column 12, line 30, after the word "prior", insert --to injection of said gas at said first injection point, said--.

Signed and sealed this 9th day of April 1974.

(SEAL)
Attest:

EDWARD M. FLETCHER, JR.
Attesting Officer

C. MARSHALL DANN
Commissioner of Patents